US012359486B2

(12) United States Patent
Anderson et al.

(10) Patent No.: US 12,359,486 B2
(45) Date of Patent: Jul. 15, 2025

(54) RETENTION DEVICE FOR A HOLD OPEN ROD

(71) Applicant: MarathonNorco Aerospace, Inc., Waco, TX (US)

(72) Inventors: Jacob Anderson, Waco, TX (US); Benjamin Dyer, Waco, TX (US)

(73) Assignee: MarathonNorco Aerospace, Waco, TX (US)

(*) Notice: Subject to any disclaimer, the term of this patent is extended or adjusted under 35 U.S.C. 154(b) by 1227 days.

(21) Appl. No.: 16/110,374

(22) Filed: Aug. 23, 2018

(65) Prior Publication Data

US 2019/0063134 A1 Feb. 28, 2019

Related U.S. Application Data

(60) Provisional application No. 62/550,145, filed on Aug. 25, 2017.

(51) Int. Cl.
*E05F 5/08* (2006.01)
*E05C 17/30* (2006.01)

(52) U.S. Cl.
CPC ................ *E05F 5/08* (2013.01); *E05C 17/30* (2013.01); *E05Y 2900/502* (2013.01); *E05Y 2900/531* (2013.01); *E05Y 2900/536* (2013.01)

(58) Field of Classification Search
CPC ...... E05F 5/08; E05C 17/30; E05Y 2900/502; E05Y 2900/531; E05Y 2900/536
See application file for complete search history.

(56) References Cited

U.S. PATENT DOCUMENTS 3,280,439 A 10/1966 McCarthy
3,362,050 A 1/1968 McCarthy
4,627,590 A 12/1986 Zeorlin
(Continued)

FOREIGN PATENT DOCUMENTS

DE 0186794 * 12/1984 ............. F16B 45/04

OTHER PUBLICATIONS

U.S. Appl. No. 14/663,227, filed Mar. 19, 2015, Dyer et al.
(Continued)

*Primary Examiner* — Kristina R Fulton
*Assistant Examiner* — Thomas L Neubauer
(74) *Attorney, Agent, or Firm* — BakerHostetler

(57) ABSTRACT

A hold open rod includes a tube configured to support a structure in a deployed configuration and the tube is further configured to have a stowed configuration. The tube includes a first end and a second end arranged at ends of a longitudinal axis of the tube. The hold open rod includes a retention device configured to hold the coupling device when the tube is in the stowed configuration. The coupling device is configured to have a locked configuration that locks the coupling device to either an attachment structure or the retention device. The coupling device is configured to lock to the attachment structure with a first portion. The coupling device is configured to lock to the retention device with a second portion. The retention device includes an opening configured to receive the coupling device and the retention device further includes an internal surface configured to engage an external surface of the coupling device.

17 Claims, 9 Drawing Sheets

(56) References Cited

U.S. PATENT DOCUMENTS

| | | | | | |
|---|---|---|---|---|---|
| 5,265,970 | A * | 11/1993 | LaBarre | F16B 21/165 403/322.2 |
| 6,428,062 | B1 * | 8/2002 | Roehl | E05C 17/042 292/339 |
| 7,654,371 | B1 * | 2/2010 | Metz | F16F 9/56 188/300 |
| 9,580,945 | B2 * | 2/2017 | Artin | F16F 9/0254 |
| D937,066 | S * | 11/2021 | Willey | D8/71 |
| 2015/0284978 | A1 | 10/2015 | Artin | |
| 2017/0306667 | A1 * | 10/2017 | Mitchell | E05C 17/30 |
| 2019/0100951 | A1 * | 4/2019 | Wetzel | E05F 1/1091 |
| 2019/0112063 | A1 * | 4/2019 | Byrne | B64D 29/08 |
| 2021/0388650 | A1 * | 12/2021 | Liao | E05C 17/30 |

OTHER PUBLICATIONS

U.S. Appl. No. 16/050,709, filed Jul. 31, 2018, Dyer et al.
U.S. Appl. No. 16/101,697, filed Aug. 13, 2018, Dyer.
International Patent Application No. PCT/US2018/047841; Int'l Search Report and the Written Opinion; dated Oct. 18, 2018; 17 pages.

* cited by examiner

RETENTION DEVICE FOR A HOLD OPEN ROD

CROSS REFERENCE TO PRIOR APPLICATIONS

This application claims the benefit of U.S. Provisional Application No. 62/550,145 filed on Aug. 25, 2017, which is hereby incorporated by reference in its entirety for all purposes as if fully set forth herein.

FIELD OF THE DISCLOSURE

The disclosure relates generally to a retention device. More particularly, the disclosure relates to a retention device for a hold open rod.

BACKGROUND OF THE DISCLOSURE

Hold open rods are well known in the automotive industry, the aviation industry, and other industries. Hold open rods hold open a door, hatch, and like structure after being opened manually or automatically. Hold open rods typically support a considerable amount of weight, particularly in the aviation industry. It is desirable that the hold open rod functions correctly and does not malfunction in supporting this weight.

In some implementations, the hold open rod may be configured to have a coupling device at one end that can attach to a hard point to support a structure in a first open position when the hold open rod is deployed. When the hold open rod is no longer operating to hold open the structure, the coupling device may be released from the hard point and the structure may be placed in a second closed position. In this regard, when the hold open rod is no longer deployed, it is beneficial to securely stow the hold open rod by attaching the coupling device to a holding mechanism. However, attaching the coupling device to the holding mechanism subjects load bearing surfaces of the coupling device to undo wear that impacts the performance of the coupling device for holding the structure. In particular, the hold open rod spends the majority of its time stowed with the coupling device attached to the holding mechanism. Additionally, this time spent stowed includes time during operations (vehicle movement) that include a great deal of vibrations associated with the vehicle movement. This results in increased wear between the coupling device and the holding mechanism.

Accordingly, it is desirable to provide an improved retention mechanism that does not subject the coupling device of the hold open rod to undo wear.

SUMMARY OF THE DISCLOSURE

The foregoing needs are met, to a great extent, by the disclosure, wherein in one aspect a technique and apparatus are provided for a hold open rod configured with an improved retention device.

In accordance with one aspect, a hold open rod includes a tube configured to support a structure in a deployed configuration and the tube further configured to have a stowed configuration; the tube including a first end and a second end arranged at ends of a longitudinal axis of the tube; a fastener portion arranged on the first end of the tube; a coupling device arranged on the second end of the tube; a retention device configured to hold the coupling device when the tube is in the stowed configuration; the coupling device configured to have a locked configuration that locks the coupling device to either an attachment structure or the retention device, wherein the coupling device is configured to lock to the attachment structure with a first portion; wherein the coupling device is configured to lock to the retention device with a second portion; wherein the retention device includes an opening configured to receive the coupling device; and wherein the retention device further includes an internal surface configured to engage an external surface of the coupling device.

In accordance with another aspect, a hold open rod includes a tube configured to support a structure in a deployed configuration and the tube further configured to have a stowed configuration; the tube including a first end and a second end arranged at ends of a longitudinal axis of the tube; a fastener portion arranged on the first end of the tube; a coupling device arranged on the second end of the tube; a retention device configured to hold the coupling device when the tube is in the stowed configuration; the coupling device configured to have a locked configuration that locks the coupling device to either an attachment structure or the retention device, wherein the coupling device is configured to lock to the attachment structure with a first portion that includes an internal surface of the coupling device; wherein the coupling device is configured to lock to the retention device with a second portion that includes an external surface of the coupling device; wherein the retention device includes an opening configured to receive the coupling device; and wherein the retention device further includes the internal surface configured to engage the external surface of the coupling device.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the disclosure. It is important, therefore, that the claims be regarded as including such equivalent constructions insofar as they do not depart from the spirit and scope of the disclosure.

BRIEF DESCRIPTION OF THE DRAWINGS

FIG. 8-1, FIG. 8-2, FIG. 8-3, FIG. 8-4, FIG. 8-5, and FIG. 8-6, illustrates an installation procedure for inserting a coupling device of a hold open rod into a retention mechanism according to aspects of the disclosure.

FIG. 9-1, FIG. 9-2, FIG. 9-3, FIG. 9-4, FIG. 9-5, and FIG. 9-6, illustrates a removal procedure for removing a coupling device of a hold open rod out of a retention mechanism according to aspects of the disclosure.

DETAILED DESCRIPTION

Figure 1:
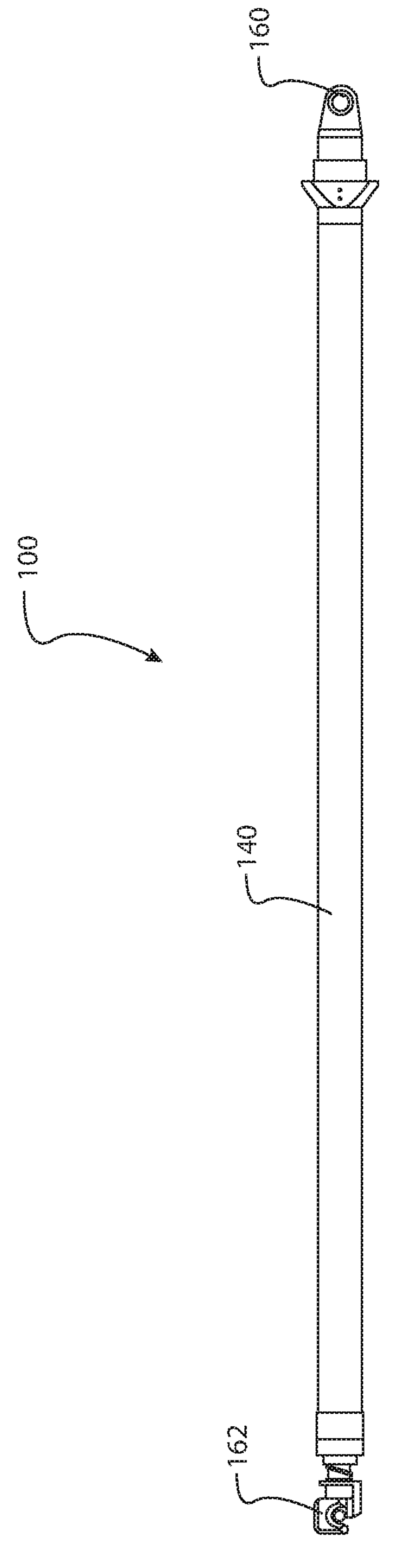
FIG. 1 illustrates a hold open rod according to one aspect of the disclosure.

The disclosure will now be described with reference to the drawing figures, in which like reference numerals refer to like parts throughout. An aspect in accordance with the disclosure provides a hold open rod configured with an improved retention device.

FIG. 1 illustrates a hold open rod according to one aspect of the disclosure.

In particular, FIG. 1 illustrates a hold open rod 100 that may include a tube 140 having a longitudinal axis. One end of the hold open rod 100 may include a fastener portion 160, such as a bearing, bushing, clevis, or the like for coupling the hold open rod 100 to a particular structure, for example, an aircraft door, a doorframe, or like structure (not shown). In one aspect, the fastener portion 160 may be a spherical bearing. The tube 140 may be made of metal such as aluminum, steel, titanium, or the like, or may be made from a synthetic material such as plastic, reinforced plastic, composite materials such as carbon fiber, or any other suitable materials.

Another end of the hold open rod 100 may include a coupling device 162 for coupling the hold open rod 100 to an attachment structure associated with a door, a hatch, an aircraft door, a doorframe, or like structure (not shown). When the hold open rod 100 is configured in the operative deployed configuration, the coupling device 162 may be attached to the attachment structure 300 (see FIGS. 3 and 4). When the hold open rod 100 is configured in a stowed configuration, the coupling device 162 may be attached to a retention device 500 to maintain the hold open rod 100 in a stowed configuration (see FIGS. 5-9). The coupling device 162 may be formed of a metallic material such as steel, aluminum, titanium, and/or the like. In one aspect, the hold open rod 100 of FIG. 1 may have a fixed length. In certain aspects, the tube 140 may have a longitudinal axis that extends between the fastener portion 160 and the coupling device 162. A cross-section of the tube 140, which is perpendicular to the longitudinal axis may be circular, oval, square, polygonal, or any other shape. The cross-section may be consistent or may vary along the length of the tube 140.

Figure 2:
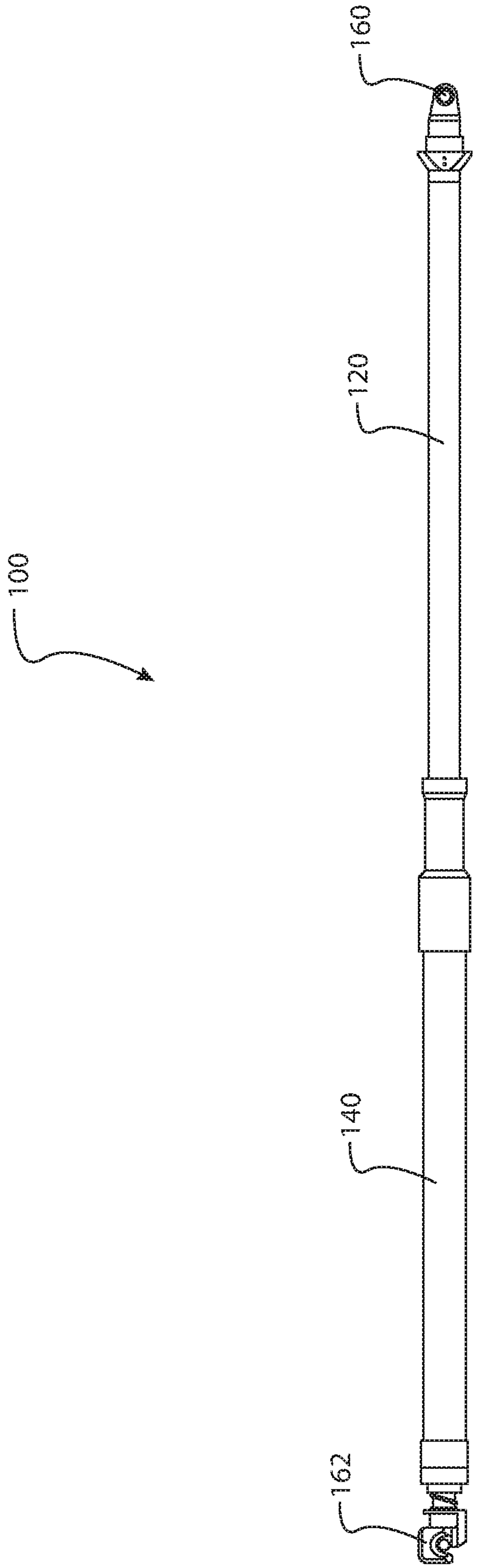
FIG. 2 illustrates another hold open rod according to one aspect of the disclosure.

FIG. 2 illustrates another hold open rod according to one aspect of the disclosure.

In particular, FIG. 2 illustrates a hold open rod 100 that may include an inner tube 120 and an outer tube 140. The outer tube 140 surrounds the inner tube 120. The inner tube 120 is configured to slide into the outer tube 140 to shorten the length of the hold open rod 100 such as when a door or hatch is shut. Then when the door or hatch is open, the inner tube 120 slides out of the outer tube 140. To lock the inner tube 120 with respect to the outer tube 140 a locking mechanism may be utilized. The inner tube 120 and the outer tube 140 may be made of metal such as aluminum, steel, titanium, or the like, or may be made from a synthetic material such as plastic, reinforced plastic, composite materials such as carbon fiber, or any other suitable materials. When the hold open rod 100 is configured in the operative deployed configuration, the coupling device 162 may be attached to the attachment structure 300 (see FIGS. 3 and 4). When the hold open rod 100 is configured in a stowed configuration, the coupling device 162 may be attached to a retention device 500 to maintain the hold open rod 100 in a stowed configuration (see FIGS. 5-9). In one aspect, the hold open rod 100 of FIG. 2 may have a variable length. The details of the locking mechanism and variable length structure are disclosed in Applicants' copending patent applications application Ser. No. 16/101,697, filed Aug. 13, 2018 (Title: Hold Open Rod Having an Internal Lock); application Ser. No. 16/050,709, filed Jul. 31, 2018 (Title: Mechanically Damped Pull Then Left Hold Open Rod Mechanism); and application Ser. No. 14/663,227, filed Mar. 19, 2015 (Title: Pull Then Lift Lock Mechanism) all of which are incorporated herein by reference in their entirety.

Figure 3:
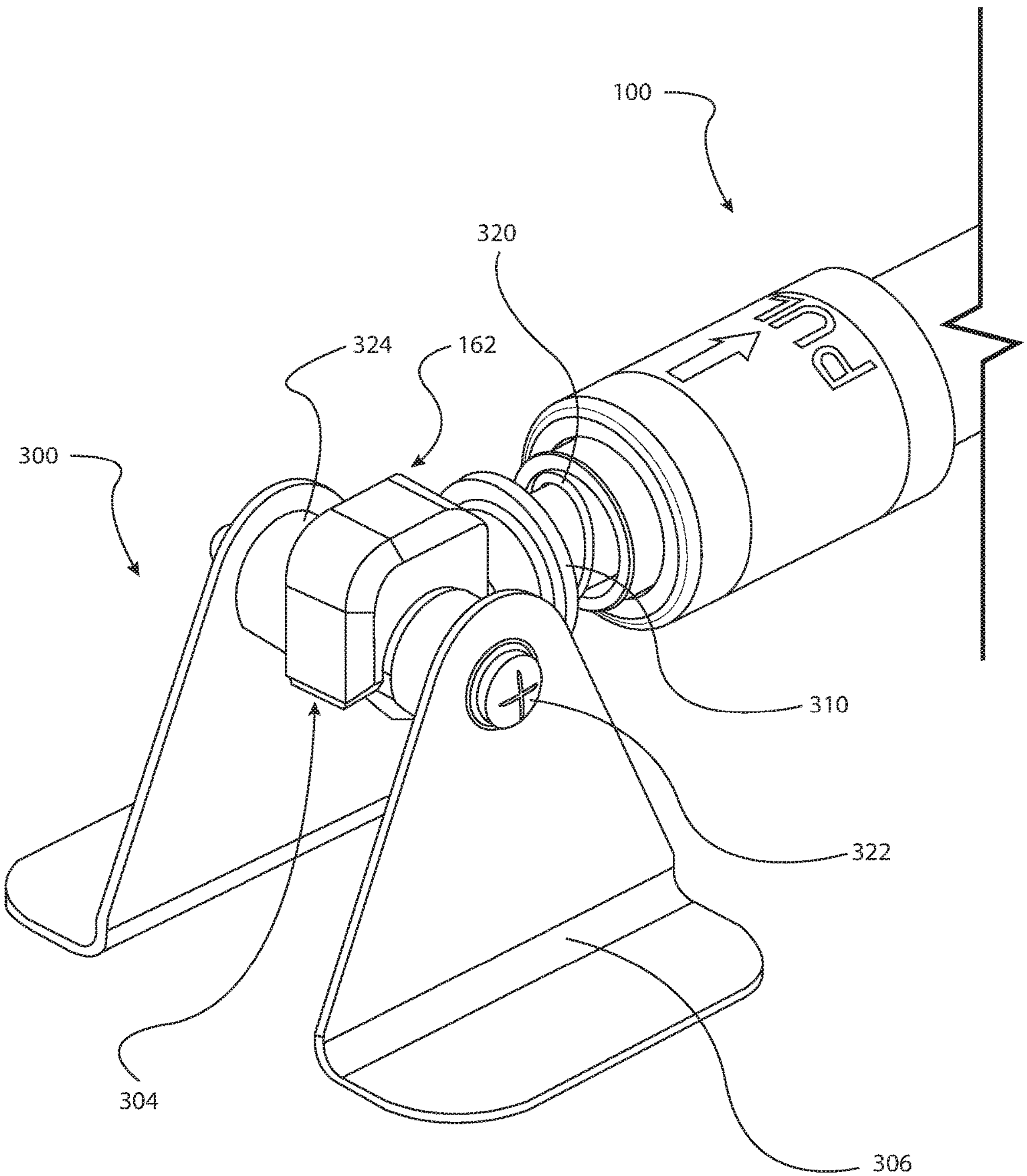
FIG. 3 illustrates a perspective view of a coupling mechanism and an attachment mechanism according to aspects of the disclosure.

FIG. 3 illustrates a perspective view of a coupling mechanism and an attachment mechanism according to aspects of the disclosure.

Figure 4:
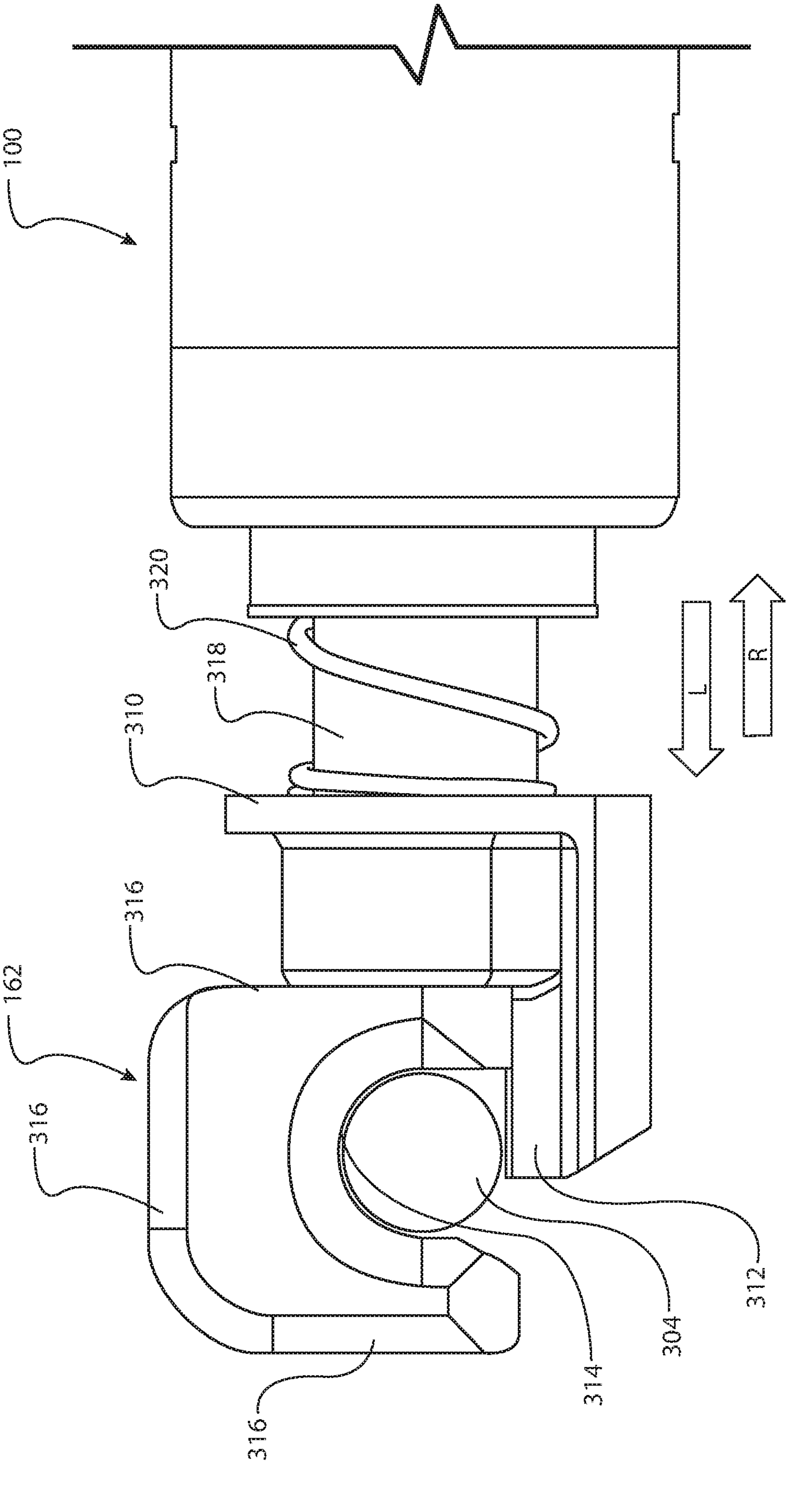
FIG. 4 illustrates a side view of a coupling mechanism and an attachment mechanism according to FIG. 3.

FIG. 4 illustrates a side view of a coupling mechanism and an attachment mechanism according to FIG. 3.

In particular, FIGS. 3 and 4 illustrate the hold open rod 100 and the coupling device 162 in a deployed configuration attached to an exemplary attachment structure 300. The attachment structure 300 may include a cylindrical spool 304 (shown in FIG. 4) and the coupling device 162 may substantially surround the spool 304. The coupling device 162 may include a cylindrical inner coupling surface 314 that contacts the spool 304 forming a mechanical connection to the spool 304. The cylindrical inner coupling surface 314 may form a load-bearing surface.

The coupling device 162 may further include a collar 310 that may be configured to slide in the direction of arrow R and arrow L along a shaft 318. In this regard, the collar 310 may include a circular aperture configured to receive the end of the shaft 318 and slide along the shaft 318. A spring 320 may be arranged on the shaft 318 to urge the collar 310 to slide along the shaft 318 in the direction of arrow L. In other words, the collar 310 is configured to move in the direction of arrow L to a locked position.

The collar 310 may further include a collar extension 312 that moves in the direction of arrow R and arrow L with the collar 310. The collar extension 312 may extend below the spool 304 when the collar extension 312 and the collar 310 are moved in the direction of arrow L. When the collar 310 and the collar extension 312 are in this position, the collar extension 312 may form a load-bearing surface and may form part of a load path. A user may grasp the collar 310 and move the collar 310 in the direction of arrow R to release the coupling device 162 from the spool 304. At the same time, the collar extension 312 may move in the direction of arrow R as well to release the coupling device 162 from the spool 304.

When the hold open rod 100 is deployed and the coupling device 162 is connected to the spool 304, there is typically very limited vibration or the like associated with all of the associated structures. For example, the hold open rod 100 may be implemented in an aircraft and during maintenance, a door may be opened and supported by the hold open rod 100. The aircraft is immobile and thus vibration is limited. Moreover, such maintenance operations are typically only for a short time period. Accordingly, wear and tear on the coupling device 162 and spool 304 are relatively minor. In particular, wear and tear on the inner coupling surface 314 of the coupling device 162, the collar extension 312, and the spool 304 are relatively minor.

The coupling device 162 may further include outer surfaces 316. The outer surfaces 316 do not make contact with the spool 304. Accordingly, any wear and tear associated with the outer surface 316 may not affect the operation of the coupling device 162 as the inner coupling surface 314 of the coupling device 162 contacts the spool 304. Also, a shape of the outer surface 316 may be optimized so that there is little or no impact on the load path when wear occurs on the outer surface 316. Moreover, the outer surface 316 is much larger than the inner coupling surface 314. Accordingly, the outer surface 316 may be more resistant to wear or may wear more slowly.

The attachment structure 300 may be implemented a number of different ways. In one aspect, the attachment structure 300 may include a plurality of support plates 306 that are configured to support the spool 304. The support plates 306 may hold the spool 304 with a mechanical fastener 322. Additionally, the attachment structure 300 may include cylindrical structures 324 arranged on the spool 304. In other aspects, there may be no support plates 306 and the spool 304 may be attached to other structures. The spool 304 may be formed of a metallic material such as steel, aluminum, titanium, and/or the like.

Figure 5:
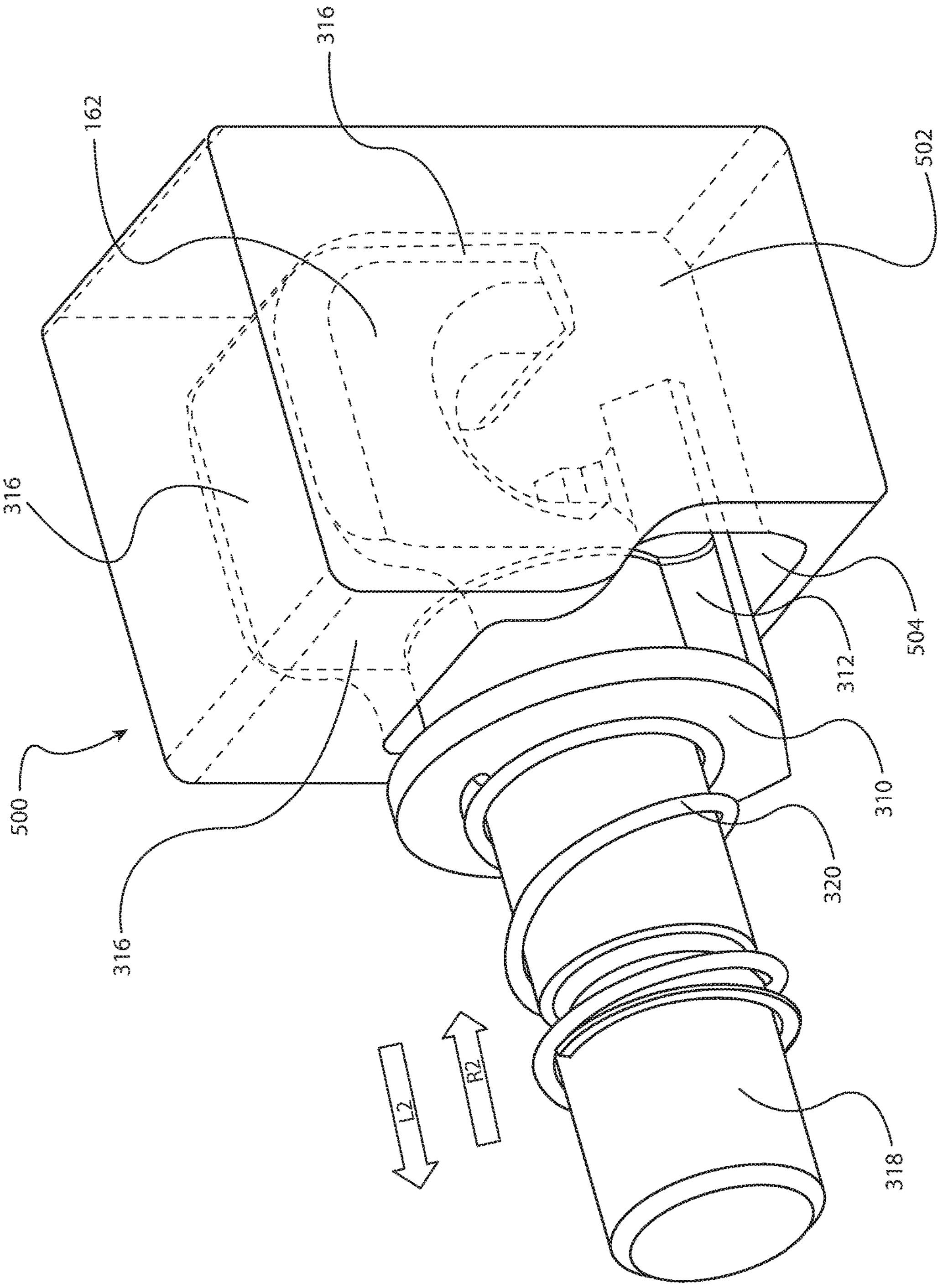
FIG. 5 illustrates a perspective and partial phantom view of a coupling mechanism and a retention mechanism according to aspects of the disclosure.

FIG. 5 illustrates a perspective and partial phantom view of a coupling mechanism and a retention mechanism according to aspects of the disclosure.

In particular, FIG. 5 illustrates a retention device 500. The retention device 500 may be formed of a metallic material such as steel, aluminum, titanium, and/or the like. The retention device 500 may be configured to hold the coupling device 162 when the hold open rod 100 is in a stowed configuration. The hold open rod 100 may be in a stowed configuration a majority of time and may be subject to greater wear and tear as there may be associated vibrations with the operation of the component to which the hold open rod 100 is attached. For example, if the hold open rod 100 is implemented in an aircraft, the hold open rod 100 may be in the stowed configuration during flight and subject to a great deal of vibration associated with the flight of the associated aircraft. In the stowed configuration, the coupling device 162 is inserted into the retention device 500.

The retention device 500 may include an opening 504 in a front face thereof. The opening 504 is sized to receive the coupling device 162, but not large enough to receive the collar extension 312. Accordingly, to insert the coupling device 162 into the retention device 500, the collar 310 along with the collar extension 312 must be moved in the direction of arrow L2. This allows the coupling device 162 to be inserted into the opening 504 and positioned within an internal part 502 of the retention device 500. Once the coupling device 162 is arranged in the internal part 502 of the retention device 500, the maintenance personnel may release the collar 310 and the spring 320 will exert a force on the collar 310 to insert the collar extension 312 into the internal part 502 of the retention device 500 along the direction of arrow R2. In this regard, the opening 504 may be sized to receive a portion of the collar 310 and the collar extension 312. This locks the coupling device 162 into the retention device 500.

Figure 6:
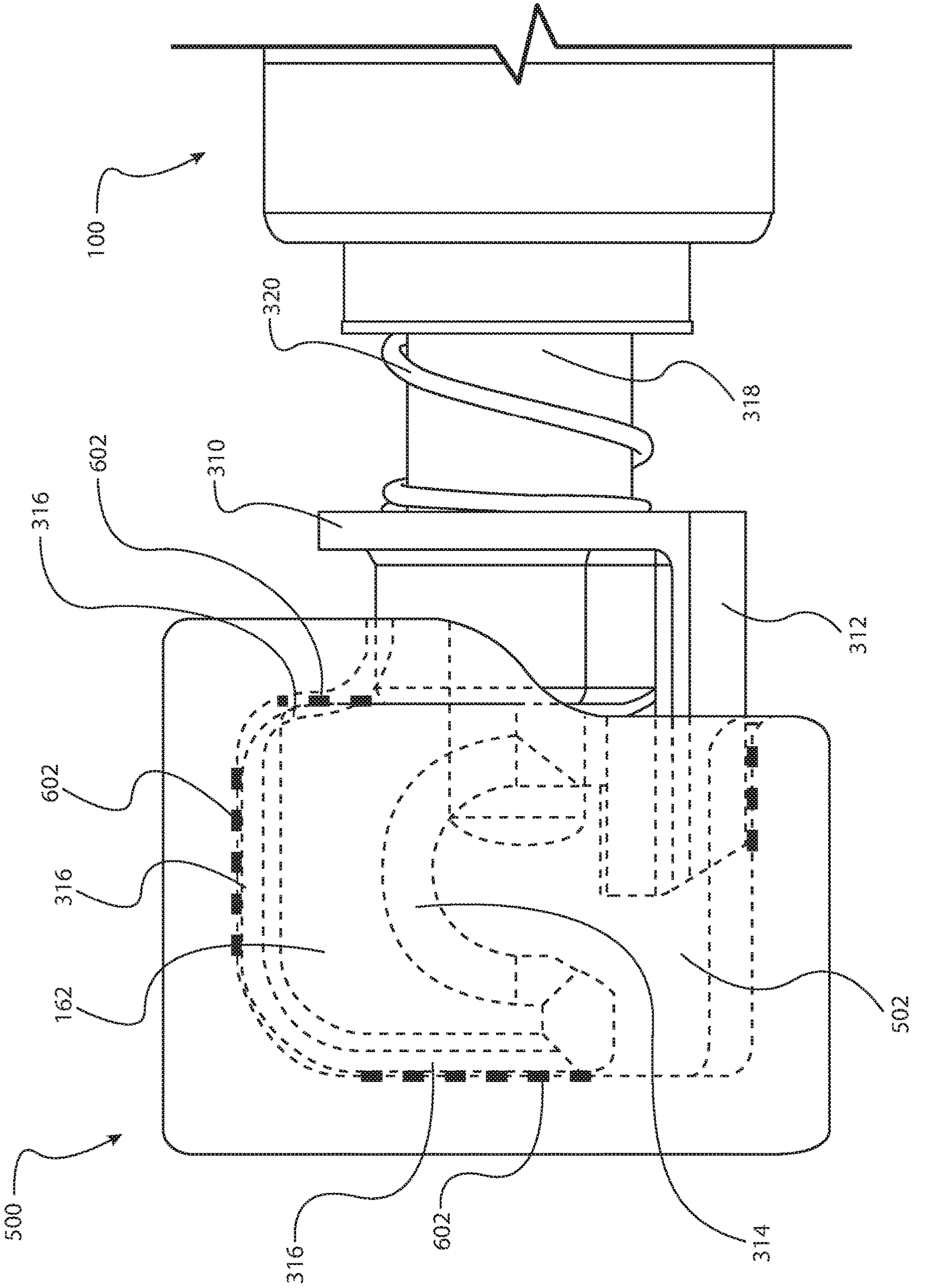
FIG. 6 illustrates a side view and partial phantom view of a coupling mechanism and a retention mechanism according to FIG. 5.

FIG. 6 illustrates a side view and partial phantom view of a coupling mechanism and a retention mechanism according to aspects of the disclosure.

In particular, FIG. 6 illustrates the coupling device 162 located within the retention device 500. The outer surfaces 316 of the coupling device 162 make contact with the internal surfaces of the internal part 502 of the retention device 500. Accordingly, any wear and tear to the coupling device 162 due to vibration or the like takes place along areas 602 of the retention device 500 and along the outer surfaces 316 of the coupling device 162. The inner coupling surface 314 may not be subjected to any wear and tear, as it is not contacting any surface.

In prior art implementations, a holding mechanism was implemented in a similar manner to the attachment structure 300. This caused a great deal of wear and tear on the inner coupling surface 314 and the spool 304. The disclosed retention device 500 limits such wear and tear to the inner coupling surface 314.

Figure 7:
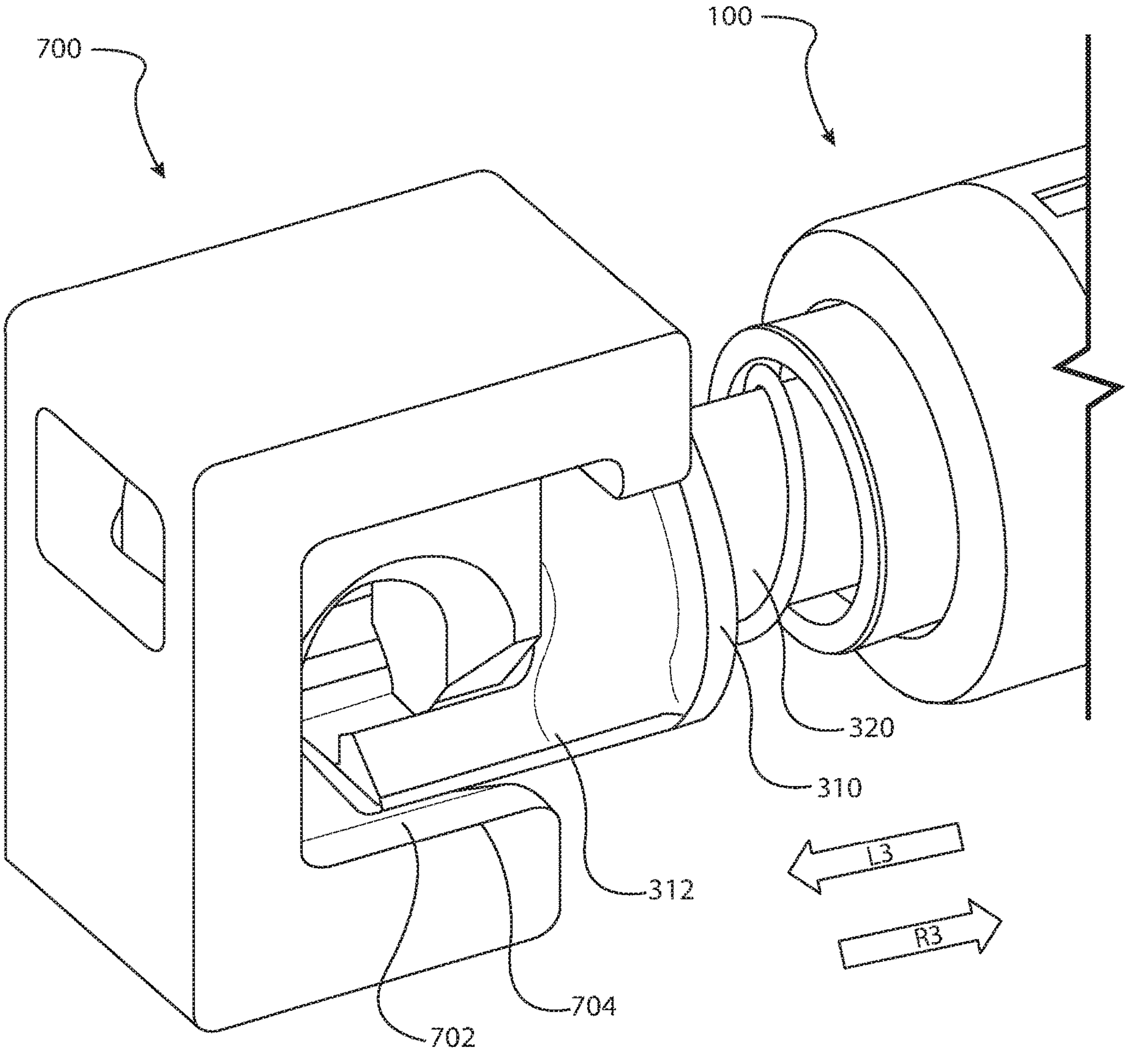
FIG. 7 illustrates a perspective view of a coupling mechanism and another aspect of a retention mechanism according to aspects of the disclosure.

FIG. 7 illustrates a perspective view of a coupling mechanism and another aspect of a retention mechanism according to aspects of the disclosure.

In particular, FIG. 7 illustrates a retention device 700. The retention device 700 may include an opening 704 arranged along a side face of the retention device 700. The retention device 700 may be formed of a metallic material such as steel, aluminum, titanium, and/or the like. The opening 704 is sized to receive the coupling device 162, but not large enough to receive the collar extension 312. Accordingly, to insert the coupling device 162 into the retention device 700, the collar 310 along with the collar extension 312 must be moved in the direction of arrow R3. This allows the coupling device 162 to be inserted into the opening 704 and positioned within an internal part 702 of the retention device 700. Once the coupling device 162 is arranged in the internal part 702 of the retention device 700, the maintenance personnel may release the collar 310 and the spring 320 will exert a force on the collar 310 to insert the collar extension 312 into the internal part 702 of the retention device 700 along the direction of arrow L3. In this regard, the opening 704 may be sized to receive a portion of the collar 310 and the collar extension 312. This locks the coupling device 162 into the retention device 700.

Figure 8:
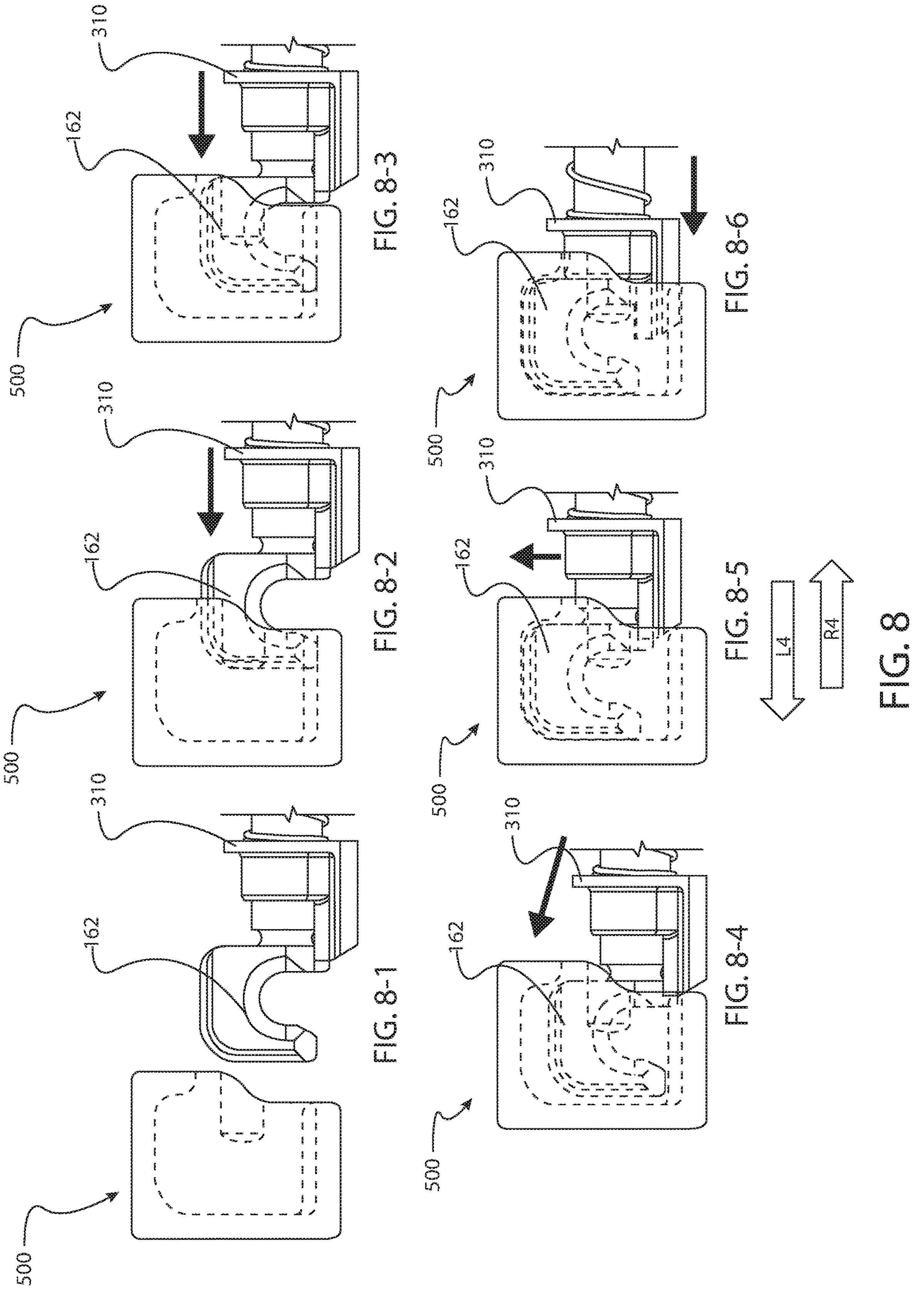
FIG. 8, which includes

FIG. 8, which includes FIG. 8-1, FIG. 8-2, FIG. 8-3, FIG. 8-4, FIG. 8-5, and FIG. 8-6, illustrates an installation procedure for inserting a coupling device of a hold open rod into a retention mechanism according to aspects of the disclosure.

In particular, FIG. 8 illustrates six different configurations of the coupling device 162, the collar 310, and the retention device 500 during an installation procedure by maintenance personnel. In configuration 1, shown in FIG. 8-1, the collar 310 is moved in the rightward direction as indicated by arrow R4 by maintenance personnel while the coupling device 162 is separated from the retention device 500. The coupling device 162 may now be ready for insertion into the retention device 500.

In configuration 2, shown in FIG. 8-2, the coupling device 162 is partially inserted into the opening of the retention device 500 in the direction indicated by an arrow (parallel to the arrow L4). In this configuration, the collar 310 continues to be held in the rightward direction as indicated by arrow R4 by maintenance personnel against the force of the spring 320.

In configuration 3, shown in FIG. 8-3, the coupling device 162 is further inserted into the opening of the retention device 500 in the direction indicated by an arrow. In this configuration, the collar 310 continues to be held in the rightward direction as indicated by arrow R4 by maintenance personnel against the force of the spring 320.

In configuration 4, shown in FIG. 8-4, the coupling device 162 is further inserted into the opening of the retention device 500 and moved upwardly as indicated by an inclined arrow. In this configuration, the collar 310 continues to be held in the rightward direction as indicated by arrow R4 by maintenance personnel against the force of the spring 320.

In configuration 5, shown in FIG. 8-5, the coupling device 162 is fully inserted into the retention device 500 by further vertical movement of the coupling device 162 as shown by the arrow. In this configuration, the collar 310 continues to be held in the rightward direction as indicated by arrow R4 by maintenance personnel against the force of the spring 320.

In configuration 6, shown in FIG. 8-6, the collar 310 is released and the collar extension 312 extends in the direction indicated by an arrow (parallel to the arrow L4) into the retention device 500 by the force of the spring 320. In this configuration, the coupling device 162 is locked into the retention device 500.

Figure 9:
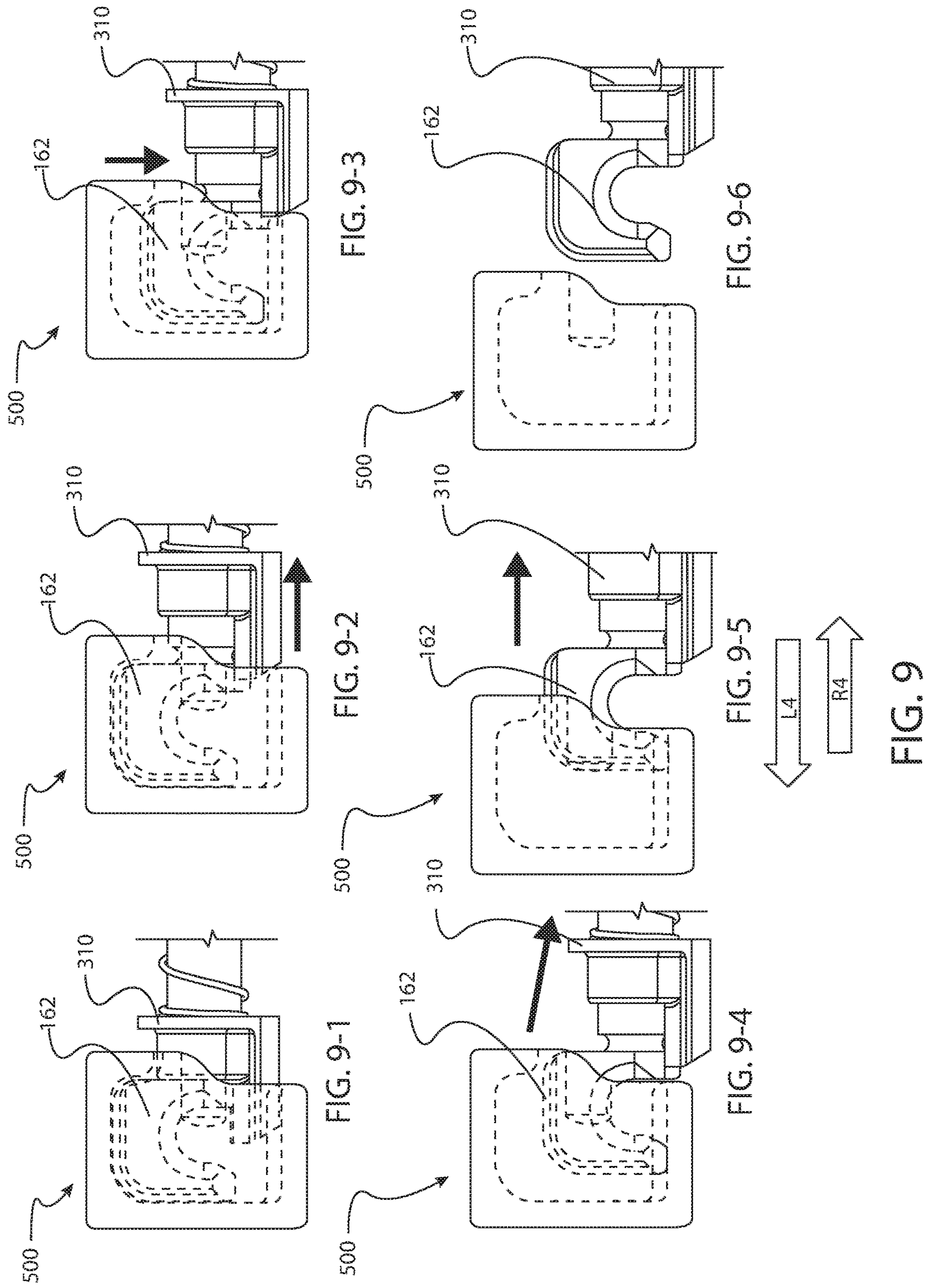
FIG. 9, which includes

FIG. 9, which includes FIG. 9-1, FIG. 9-2, FIG. 9-3, FIG. 9-4, FIG. 9-5, and FIG. 9-6, illustrates a removal procedure for removing a coupling device of a hold open rod out of a retention mechanism according to aspects of the disclosure.

In particular, FIG. 9 illustrates six different configurations of the coupling device 162, the collar 310, and the retention device 500 during a removal procedure by maintenance personnel.

In configuration 1, shown in FIG. 9-1, the collar 310 is currently released and the collar extension 312 extends into the retention device 500. In this configuration, the coupling device 162 is locked into the retention device 500.

In configuration 2, shown in FIG. 9-2, the coupling device 162 is fully inserted in the retention device 500 and the collar 310 may be moved in the rightward direction as indicated by an arrow (parallel to the arrow R4) by maintenance personnel against the force of the spring 320.

In configuration 3, shown in FIG. 9-3, the coupling device 162 is partially removed from the opening of the retention device 500 and moved downwardly as illustrated by the arrow. In this configuration, the collar 310 continues to be held in the rightward direction as indicated by arrow R4 by maintenance personnel against the force of the spring 320.

In configuration 4, shown in FIG. 9-4, the coupling device 162 is further downwardly moved with respect to the opening of the retention device 500 as indicated by an arrow. In this configuration, the collar 310 continues to be held in the rightward direction as indicated by arrow R4 by maintenance personnel against the force of the spring 320.

In configuration 5, shown in FIG. 9-5, the coupling device 162 is further removed from the opening of the retention device 500 in the direction indicated by an arrow (parallel to the arrow R4). In this configuration, the collar 310 continues to be held in the rightward direction as indicated by arrow R4 by maintenance personnel against the force of the spring 320.

In configuration 6, shown in FIG. 9-6, the coupling device 162 is moved in the rightward direction in the direction indicated by arrow R4 by maintenance personnel and the coupling device 162 is separated from the retention device 500.

Accordingly, the disclosure has set forth an improved hold open rod and retention mechanism that provides reduced wear and tear on critical load bearing portions and/or the like.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the disclosure. As used herein, the term "and/or" includes any and all combinations of one or more of the associated listed items.

Relative terms such as "left" or "right" or "below" or "above" or "upper" or "lower" or "horizontal" or "vertical" may be used herein to describe a relationship of one element or region to another element or region as illustrated in the Figures. It will be understood that these terms and those discussed above are intended to encompass different orientations of the device in addition to the orientation depicted in the Figures.

The terminology used herein is for the purpose of describing particular aspects only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

The invention claimed is:

1. A hold open rod comprising:

a tube configured to support a structure in a deployed configuration and the tube further configured to have a stowed configuration;

the tube comprising a first end and a second end arranged at ends of a longitudinal axis of the tube;

a fastener portion arranged on the first end of the tube;

a coupling device arranged on the second end of the tube and the coupling device comprising an inner coupling surface and outer coupling surfaces, wherein the outer coupling surfaces of the coupling device comprise a C-shaped structure configured to be received by a retention device along an outer surface of the C-shaped structure, and wherein the inner coupling surface of the coupling device comprises a C-shaped structure configured to receive a cylindrical spool associated with an attachment structure along an inner surface of the C-shaped structure;

the retention device configured to hold the coupling device when the tube is in the stowed configuration; and the coupling device configured to have a locked configuration that locks the coupling device to either the attachment structure when in a deployed configuration or the retention device when in a stowed configuration, wherein the coupling device is configured to lock to the attachment structure with the inner coupling surface;

wherein the coupling device is configured to lock to the retention device with the outer coupling surfaces;

wherein the retention device comprises an opening configured to receive the coupling device;

wherein the retention device further comprises an internal surface configured to engage an external surface of the outer coupling surfaces of the coupling device; and wherein the coupling device is configured to be located within the retention device such that the outer coupling surfaces of the coupling device make contact with the internal surface of an internal part of the retention device; and the hold open rod further comprising the attachment structure and the attachment structure comprising the cylindrical spool, wherein the coupling device comprises a collar and a shaft;

wherein the collar comprises a collar extension configured to move with the collar:

wherein the collar extension is configured to move in a first direction to extend below the cylindrical spool;

wherein the collar extension is configured to form a load-bearing surface; and wherein the collar extension is configured to move in a second direction to release the coupling device from the cylindrical spool.

2. The hold open rod of claim 1, further comprising the attachment structure, wherein the opening of the retention device is sized and configured to receive the coupling device;

wherein the coupling device is configured to be at least partially inserted into the opening of the retention device;

wherein the coupling device is configured to be at least partially positioned within the internal part of the retention device; and wherein the opening of the retention device is arranged on one of the following: a front face of the retention device or a side face of the retention device.

3. The hold open rod of claim 1, further comprising the attachment structure and the attachment structure comprising the cylindrical spool, wherein the inner coupling surface of the coupling device is configured to contact the cylindrical spool and at least partially surround the cylindrical spool;

wherein the coupling device and the inner coupling surface of the coupling device are configured to form a mechanical connection to the cylindrical spool;

wherein the inner coupling surface of the coupling device is configured to form a load-bearing surface;

wherein the coupling device includes a collar extension;

wherein the attachment structure is configured to receive the coupling device when the collar extension is retracted; and wherein the opening of the retention device is configured to receive the coupling device when the collar extension is retracted.

4. The hold open rod of claim 1, wherein the outer coupling surfaces of the coupling device are larger than the inner coupling surface of the coupling device such that the outer coupling surfaces of the coupling device are more resistant than the inner coupling surface of the coupling device.

5. A hold open rod comprising:

a tube configured to support a structure in a deployed configuration and the tube further configured to have a stowed configuration;

the tube comprising a first end and a second end arranged at ends of a longitudinal axis of the tube;

a fastener portion arranged on the first end of the tube;

a coupling device arranged on the second end of the tube and the coupling device comprising an inner coupling surface and outer coupling surfaces, wherein the outer coupling surfaces of the coupling device comprise a C-shaped structure configured to be received by a retention device along an outer surface of the C-shaped structure, and wherein the inner coupling surface of the coupling device comprises a C-shaped structure configured to receive a cylindrical spool associated with an attachment structure along an inner surface of the C-shaped structure;

the retention device configured to hold the coupling device when the tube is in the stowed configuration;

the attachment structure; and the coupling device configured to have a locked configuration that locks the coupling device to either the attachment structure or the retention device, wherein the coupling device is configured to lock to the attachment structure with the inner coupling surface;

wherein the coupling device is configured to lock to the retention device with the outer coupling surfaces;

wherein the retention device comprises an opening configured to receive the coupling device;

wherein the retention device further comprises an internal surface configured to engage an external surface of the outer coupling surfaces of the coupling device;

wherein the coupling device includes a collar extension;

wherein the opening of the retention device is configured to receive the collar extension when the coupling device is fully inserted into the retention device; and wherein the coupling device is configured to be at least partially positioned within an internal part of the retention device; and the hold open rod further comprising the attachment structure and the attachment structure comprising a cylindrical structure, wherein the tube comprises:

an inner member;

an outer member configured to have the inner member slide in and out of the outer member; and a locking mechanism configured to selectively lock the inner member and the outer member with respect to each other, wherein the coupling device comprises a collar and a shaft;

wherein the collar comprises a circular aperture configured to receive the shaft;

wherein the collar is configured to slide along the shaft; and wherein the collar extension is configured to move with the collar.

6. A hold open rod comprising:

a tube configured to support a structure in a deployed configuration and the tube further configured to have a stowed configuration;

the tube comprising a first end and a second end arranged at ends of a longitudinal axis of the tube;

a fastener portion arranged on the first end of the tube;

a coupling device arranged on the second end of the tube and the coupling device comprising an inner coupling surface and outer coupling surfaces, wherein the outer coupling surfaces of the coupling device comprise a C-shaped structure configured to be received by a retention device along an outer surface of the C-shaped structure, and wherein the inner coupling surface of the coupling device comprises a C-shaped structure configured to receive a cylindrical spool associated with an attachment structure along an inner surface of the C-shaped structure;

the retention device configured to hold the coupling device when the tube is in the stowed configuration; and the coupling device configured to have a locked configuration that locks the coupling device to either the attachment structure when in a deployed configuration or the retention device when in a stowed configuration, wherein the coupling device is configured to lock to the attachment structure with the inner coupling surface;

wherein the coupling device is configured to lock to the retention device with the outer coupling surfaces;

wherein the retention device comprises an opening configured to receive the coupling device;

wherein the retention device further comprises an internal surface configured to engage an external surface of the outer coupling surfaces of the coupling device; and wherein the coupling device is configured to be located within the retention device such that the outer coupling surfaces of the coupling device make contact with the internal surface of an internal part of the retention device, wherein the coupling device comprises a collar and a shaft;

wherein the collar comprises a collar extension configured to move with the collar;

wherein the collar extension is configured to move in a first direction to extend below a cylindrical spool;

wherein the collar extension is configured to move in a second direction to release the coupling device from the cylindrical spool; and wherein the coupling device further comprises a collar extension configured to be received by the retention device.

7. The hold open rod of claim 6, further comprising the attachment structure and the attachment structure comprising a cylindrical structure, wherein the collar comprises a circular aperture configured to receive the shaft;

wherein the coupling device comprises a spring arranged on the shaft to urge the collar to slide along the shaft; and wherein the collar extension is configured to slide along a shaft between the coupling device and the tube to be inserted into the retention device.

8. A hold open rod comprising:

a tube configured to support a structure in a deployed configuration and the tube further configured to have a stowed configuration;

the tube comprising a first end and a second end arranged at ends of a longitudinal axis of the tube;

a fastener portion arranged on the first end of the tube;

a coupling device arranged on the second end of the tube and the coupling device comprising an inner coupling surface and outer coupling surfaces, wherein the outer coupling surfaces of the coupling device comprise a C-shaped structure configured to be received by a retention device along an outer surface of the C-shaped structure, and wherein the inner coupling surface of the coupling device comprises a C-shaped structure configured to receive a cylindrical spool associated with an attachment structure along an inner surface of the C-shaped structure;

the retention device configured to hold the coupling device when the tube is in the stowed configuration; and the coupling device configured to have a locked configuration that locks the coupling device to either the attachment structure when in a deployed configuration or the retention device when in a stowed configuration, wherein the coupling device is configured to lock to the attachment structure with the inner coupling surface;

wherein the coupling device is configured to lock to the retention device with the outer coupling surfaces;

wherein the retention device comprises an opening configured to receive the coupling device;

wherein the retention device further comprises an internal surface configured to engage an external surface of the outer coupling surfaces of the coupling device; and wherein the coupling device is configured to be located within the retention device such that the outer coupling surfaces of the coupling device make contact with the internal surface of an internal part of the retention device; and wherein the tube comprises:

an inner member;

an outer member configured to have the inner member slide in and out of the outer member; and a locking mechanism configured to selectively lock the inner member and the outer member with respect to each other, wherein the coupling device comprises a collar, a shaft, a collar extension, and a spring arranged on the shaft to urge the collar to slide along the shaft; and wherein the collar and the spring are configured to insert the collar extension into the internal part of the retention device to lock the coupling device into the retention device.

9. A hold open rod comprising:

a tube configured to support a structure in a deployed configuration and the tube further configured to have a stowed configuration;

the tube comprising a first end and a second end arranged at ends of a longitudinal axis of the tube;

a fastener portion arranged on the first end of the tube;

a coupling device arranged on the second end of the tube and the coupling device comprising an inner coupling surface and outer coupling surfaces, wherein the outer coupling surfaces of the coupling device comprise a C-shaped structure configured to be received by a retention device along an outer surface of the C-shaped structure, and wherein the inner coupling surface of the coupling device comprises a C-shaped structure configured to receive a cylindrical spool associated with an attachment structure along an inner surface of the C-shaped structure;

the retention device configured to hold the coupling device when the tube is in the stowed configuration; and the coupling device configured to have a locked configuration that locks the coupling device to either the attachment structure when in a deployed configuration or the retention device when in the stowed configuration, wherein the coupling device is configured to lock to the attachment structure with the inner coupling surface that comprises an internal surface of the coupling device;

wherein the coupling device is configured to lock to the retention device with the outer coupling surface that comprises an external surface of the coupling device;

wherein the retention device comprises an opening configured to receive the coupling device;

wherein the retention device further comprises an internal surface arranged in the opening configured to engage the external surface of the coupling device; and wherein the outer coupling surfaces of the coupling device are larger than the inner coupling surface of the coupling device such that the outer coupling surfaces of the coupling device are more resistant than the inner coupling surface of the coupling device; and the hold open rod further comprising the attachment structure and the attachment structure comprising a cylindrical structure, wherein the coupling device comprises a collar and a shaft;

wherein the collar comprises a collar extension configured to move with the collar;

wherein the collar extension is configured to move in a first direction to extend below the cylindrical spool; and wherein the collar extension is configured to move in a second direction to release the coupling device from the cylindrical spool.

10. The hold open rod of claim 9, wherein the opening of the retention device is sized and configured to receive the coupling device;

wherein the coupling device is configured to be at least partially inserted into the opening of the retention device;

wherein the coupling device is configured to be at least partially positioned within an internal part of the retention device; and wherein the opening of the retention device is arranged on one of the following: a front face of the retention device or a side face of the retention device.

11. The hold open rod of claim 9, wherein the coupling device is configured to be located within the retention device such that the outer coupling surfaces of the coupling device make contact with the internal surface of an internal part of the retention device;

wherein the coupling device includes a collar extension; and wherein the opening of the retention device is configured to receive the coupling device when the collar extension is retracted.

12. The hold open rod of claim 9, wherein the coupling device includes a collar extension; and wherein the opening of the retention device is configured to receive the collar extension when the coupling device is fully inserted into the retention device.

13. The hold open rod of claim 9, wherein the coupling device further comprises a collar extension configured to be received by the retention device; and wherein the outer coupling surfaces of the coupling device are larger than the inner coupling surface of the coupling device such that the outer coupling surfaces of the coupling device are more resistant than the inner coupling surface of the coupling device.

14. The hold open rod of claim 13, wherein the collar extension is configured to slide along a shaft between the coupling device and the tube to be inserted into the retention device;

wherein the coupling device comprises a collar and a shaft;

wherein the collar comprises a collar extension configured to move with the collar;

wherein the collar extension is configured to move in a first direction to extend below the cylindrical spool; and wherein the collar extension is configured to move in a second direction to release the coupling device from the cylindrical spool.

15. The hold open rod of claim 14, wherein the coupling device comprises an opening configured to receive the C-shaped structure when the collar extension is in a retracted configuration;

wherein the opening is configured to lock the C-shaped structure when the collar extension is in an extended configuration;

wherein the collar comprises a circular aperture configured to receive the shaft; and wherein the coupling device comprises a spring arranged on the shaft to urge the collar to slide along the shaft.

16. A hold open rod comprising:

a tube configured to support a structure in a deployed configuration and the tube further configured to have a stowed configuration;

the tube comprising a first end and a second end arranged at ends of a longitudinal axis of the tube;

a fastener portion arranged on the first end of the tube;

a coupling device arranged on the second end of the tube and the coupling device comprising an inner coupling surface and outer coupling surfaces, wherein the outer coupling surfaces of the coupling device comprise a C-shaped structure configured to be received by a retention device along an outer surface of the C-shaped structure, and wherein the inner coupling surface of the coupling device comprises a C-shaped structure configured to receive a cylindrical spool associated with an attachment structure along an inner surface of the C-shaped structure;

the retention device configured to hold the coupling device when the tube is in the stowed configuration; and the coupling device configured to have a locked configuration that locks the coupling device to either the attachment structure when in a deployed configuration or the retention device when in the stowed configuration, wherein the coupling device is configured to lock to the attachment structure with the inner coupling surface that comprises an internal surface of the coupling device;

wherein the coupling device is configured to lock to the retention device with the outer coupling surface that comprises an external surface of the coupling device;

wherein the retention device comprises an opening configured to receive the coupling device;

wherein the retention device further comprises an internal surface arranged in the opening configured to engage the external surface of the coupling device; and wherein the outer coupling surfaces of the coupling device are larger than the inner coupling surface of the coupling device such that the outer coupling surfaces of the coupling device are more resistant than the inner coupling surface of the coupling device;

wherein the tube comprises:

an inner member;

an outer member configured to have the inner member slide in and out of the outer member; and a locking mechanism configured to selectively lock the inner member and the outer member with respect to each other, wherein the coupling device comprises a collar, a shaft, a collar extension, and a spring arranged on the shaft to urge the collar to slide along the shaft; and wherein the collar and the spring are configured to insert the collar extension into an internal part of the retention device to lock the coupling device into the retention device.

17. A hold open rod comprising:

a tube configured to support a structure in a deployed configuration and the tube further configured to have a stowed configuration;

the tube comprising a first end and a second end arranged at ends of a longitudinal axis of the tube;

a fastener portion arranged on the first end of the tube;

a coupling device arranged on the second end of the tube and the coupling device comprising an inner coupling surface and outer coupling surfaces, wherein the outer coupling surfaces of the coupling device comprise a C-shaped structure configured to be received by a retention device along an outer surface of the C-shaped structure, and wherein the inner coupling surface of the coupling device comprises a C-shaped structure configured to receive a cylindrical spool associated with an attachment structure along an inner surface of the C-shaped structure;

the retention device configured to hold the coupling device when the tube is in the stowed configuration; and the coupling device configured to have a locked configuration that locks the coupling device to either the attachment structure when in a deployed configuration or the retention device when in a stowed configuration, wherein the coupling device is configured to lock to the attachment structure with the inner coupling surface;

wherein the coupling device is configured to lock to the retention device with the outer coupling surfaces;

wherein the retention device comprises an opening configured to receive the coupling device;

wherein the retention device further comprises an internal surface configured to engage an external surface of the outer coupling surfaces of the coupling device; and wherein the coupling device is configured to be located within the retention device such that the outer coupling surfaces of the coupling device make contact with the internal surface of an internal part of the retention device; and the hold open rod further comprising the attachment structure and the attachment structure comprising a cylindrical structure, wherein the coupling device comprises a collar and a shaft;

wherein the collar comprises a circular aperture configured to receive the shaft;

wherein the collar is configured to slide along the shaft; and wherein the tube comprises:

an inner member;

an outer member configured to have the inner member slide in and out of the outer member; and a locking mechanism configured to selectively lock the inner member and the outer member with respect to each other.

* * * * *